US012493121B2

(12) United States Patent
Cronin et al.

(10) Patent No.: US 12,493,121 B2
(45) Date of Patent: Dec. 9, 2025

(54) HIGH RESOLUTION LIDAR SCANNING

(71) Applicant: Nokia Technologies Oy, Espoo (FI)

(72) Inventors: Harry Michael Cronin, Cambridge (GB); Christopher John Wright, London (GB); Phil Peter Catton, Cambridge (GB); William Schnabel, Surrey (GB)

(73) Assignee: Nokia Technologies Oy, Espoo (FI)

( * ) Notice: Subject to any disclaimer, the term of this patent is extended or adjusted under 35 U.S.C. 154(b) by 989 days.

(21) Appl. No.: 17/586,132

(22) Filed: Jan. 27, 2022

(65) Prior Publication Data
US 2022/0244392 A1    Aug. 4, 2022

(30) Foreign Application Priority Data

Feb. 1, 2021 (EP) .................................... 21154534

(51) Int. Cl.
*G01S 17/894* (2020.01)
*G01S 7/4863* (2020.01)
(Continued)

(52) U.S. Cl.
CPC .......... *G01S 17/894* (2020.01); *G01S 7/4863* (2013.01); *G01S 17/26* (2020.01); *G01S 17/86* (2020.01); *G01S 7/4865* (2013.01)

(58) Field of Classification Search
CPC ...... G01S 17/894; G01S 17/26; G01S 7/4813; G01S 17/89; H04M 1/04; H04M 1/0214; G06F 1/1616
See application file for complete search history.

(56) References Cited

U.S. PATENT DOCUMENTS 7,832,641 B2 * 11/2010 Blake ................. G06K 7/10881
                                                        235/462.01
10,558,277 B2 * 2/2020 Henell .................. G06F 1/1681
(Continued)

FOREIGN PATENT DOCUMENTS

CN          109814109 B  * 12/2020
EP            2221639 A1    8/2010
(Continued)

OTHER PUBLICATIONS

CN 109814109 B English (Year: 2020).*
(Continued)

*Primary Examiner* — Yuqing Xiao
*Assistant Examiner* — Jempson Noel
(74) *Attorney, Agent, or Firm* — McCarter & English LLP

(57) ABSTRACT

Lidar imaging techniques are disclosed. An example method includes projecting direct laser beams toward an area of interest, and projecting reflected laser beams toward the area of interest, wherein the reflected laser beams are reflected from a reflective surface disposed at a known location relative to an electronic device. The method also includes receiving light scattered in the area of interest due to the direct laser beams and the reflected laser beams. The method also includes determining signal characteristics of the detected scattered light received from the area of interest caused by both the direct laser beams and the reflected laser beams. The method also includes computing a depth map corresponding to the area of interest based on the signal characteristics.

23 Claims, 7 Drawing Sheets

(51) Int. Cl.
*G01S 7/4865* (2020.01)
*G01S 17/26* (2020.01)
*G01S 17/86* (2020.01)

(56) References Cited

U.S. PATENT DOCUMENTS

| | | | |
|---|---|---|---|
| 10,739,461 B2 | 8/2020 | Agarwal | |
| 10,840,474 B2 | 11/2020 | Ai et al. | |
| 2003/0042304 A1* | 3/2003 | Knowles | G02B 19/0085 235/384 |
| 2004/0114205 A1 | 6/2004 | Richman et al. | |
| 2010/0208234 A1* | 8/2010 | Kaehler | G01S 17/42 356/5.01 |
| 2011/0058167 A1* | 3/2011 | Knox | G01N 21/53 356/338 |
| 2019/0049587 A1 | 2/2019 | Topliss et al. | |
| 2019/0129038 A1 | 5/2019 | Goeltner et al. | |
| 2020/0241672 A1 | 7/2020 | Kushnir et al. | |
| 2020/0256993 A1 | 8/2020 | Oggier | |
| 2020/0349375 A1 | 11/2020 | Quigley et al. | |
| 2021/0025997 A1* | 1/2021 | Rosenzweig | G01S 7/4817 |

FOREIGN PATENT DOCUMENTS

| | | | | |
|---|---|---|---|---|
| EP | 3337141 A1 * | 6/2018 | | H04B 1/38 |
| WO | 2018/055449 A2 | 3/2018 | | |

OTHER PUBLICATIONS

"Lidar is one of the iPhone and iPad's coolest tricks. Here's what else it can do", cnet Tech, Retrieved on Jan. 12, 2022, Webpage available at : https://www.cnet.com/tech/mobile/lidar-is-one-of-the-iphone-ipad-coolest-tricks-its-only-getting-better/.

"Lidar used to cost $75,000—here's how Apple brought it to the iPhone", ars Technica, Retrieved on Jan. 12, 2022, Webpage available at : https://arstechnica.com/cars/2020/10/the-technology-behind-the-iphone-lidar-may-be-coming-soon-to-cars/.

"How Apple's LiDAR Sensor Differs From The One On Its 'TrueDepth' Face ID", eyerys, Retrieved on Jan. 12, 2022, Webpage available at: https://www.eyerys.com/articles/how-apples-lidar-sensor-differs-one-its-truedepth-face-id.

"Facial Recognition: 3D TOF camera technology improves facial recognition accuracy and security", LaserFocusWorld, Retrieved on Jan. 12, 2022, Webpage available at : https://www.laserfocusworld.com/detectors-imaging/article/16555309/facial-recognition-3d-tof-camera-technology-improves-facial-recognition-accuracy-and-security.

"LIDAR: Peek Into The Future With iPad Pro", Lux, Retrieved on Jan. 12, 2022, Webpage available at : https://lux.camera/lidar-peek-into-the-future-with-ipad-pro/.

"5 ways LiDAR is transforming the world before our eyes", Geo Spatial World, Retrieved on Jan. 12, 2022, Webpage available at : https://www.geospatialworld.net/blogs/5-ways-lidar-is-transforming-the-world-before-our-eyes/.

Zhao et al., "Mapping with Reflection—Detection and Utilization of Reflection in 3D Lidar Scans", arXiv, Oct. 27, 2020, 8 pages.

"Vivo Smartphone ToF Camera is Official Now", Image Sensors World, Retrieved on Jan. 12, 2022, Webpage available at : http://image-sensors-world.blogspot.com/2018/06/vivo-smartphone-tof-camera-is-official.html.

Partial European Search Report received for corresponding European Patent Application No. 21154534.8, dated Jul. 5, 2021, 14 pages.

Extended European Search Report received for corresponding European Patent Application No. 21154534.8, dated Oct. 8, 2021, 16 pages.

Office Action received for corresponding European Patent Application No. 21154534.8, dated May 14, 2024, 8 pages.

* cited by examiner

300

400

HIGH RESOLUTION LIDAR SCANNING

RELATED APPLICATION

This application claims priority to the European patent application number 21154534.8, filed on Feb. 1, 2021, the content of which is incorporated herein by reference in its entirety.

TECHNOLOGICAL FIELD

Example embodiments relate to techniques for generating high-resolution depth maps using lidar imaging.

BACKGROUND

Lidar-based sensing has various possible applications in the smart phone market. For example, lidar provides the ability to generate three-dimensional (3D) models of objects that can be used for purposes such as replication via 3D printers. Lidar also provides the ability to generate a 3D map of a room, which can be used for augmented reality applications. Various other uses are possible such as facial imaging and biometrics, photograph enhancement, and others.

BRIEF SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to various embodiments there is provided an apparatus that includes a laser projector to direct a plurality of laser beams toward an area of interest, wherein the plurality of laser beams follow a plurality of paths comprising a direct laser beam path and a reflected laser beam path, wherein the reflected laser beam path is from the laser projector to a reflective surface disposed at a known location relative to the apparatus then toward the area of interest. The example apparatus also includes a photodetector to detect scattered light scattered in the area of interest due to the plurality of laser beams and the plurality of paths. The example apparatus also includes at least one processor and at least one memory including computer program code. The memory and the computer program code are configured to, with the at least one processor, cause the apparatus to measure signal characteristics of the detected scattered light caused by both the direct laser beam path and the reflected laser beam path, and compute a depth map corresponding to the area of interest based on the signal characteristics.

The reflective surface may disposed on a peripheral component configured to be disposed in proximity to the apparatus at a known location. The reflective surface may also be a component of a peripheral attachment configured to be removably coupled to the apparatus. Additionally, the reflective surface may also be disposed on a component of the apparatus.

In some embodiments, the apparatus can include a first portion and a second portion connected together by a hinge, wherein the reflective surface is disposed on the second portion. For example, the apparatus may be a smart phone with a clamshell form factor wherein the first portion and second portion are permanently coupled by the hinge. Alternatively, the second portion may be a component of a peripheral attachment configured to be removably coupled to the apparatus.

In some embodiments, the angle of the reflective surface is determined based on laser beams emitted by the laser projector and received by the photodetector after reflection at the reflective surface without being emitted into the area of interest. Additionally, the memory and computer program code may be configured, with the at least one processor, to cause the apparatus to guide a user to adjust an angle of the reflective surface during a scan of the area of interest. The memory and computer program code may also be configured, with the at least one processor, to cause the apparatus to distinguish the direct laser beams and the reflected laser beams by switching between a high gain mode to detect reflected laser beams and a low gain mode to detect direct laser beams.

According to various embodiments there is provided a method performed by an electronic device to compute a depth map. The example method includes projecting direct laser beams toward an area of interest, and projecting reflected laser beams toward the area of interest, wherein the reflected laser beams are reflected from a reflective surface disposed at a known location relative to an electronic device. The method also includes receiving light scattered in the area of interest due to the direct laser beams and the reflected laser beams. The method also includes determining signal characteristics of the detected scattered light received from the area of interest caused by both the direct laser beams and the reflected laser beams. The method also includes computing a depth map corresponding to the area of interest based on the signal characteristics.

In some embodiments, the method may also include generating a user interface that guides a user to adjust an angle of the reflective surface until at least one of the direct laser beams and at least one of the reflected laser beams lie on a same point within the area of interest. The electronic device may include a first portion and a second portion connected together by a hinge, wherein the direct laser beams and reflected laser beams originate from the first portion, and wherein the reflective surface is disposed on the second portion. The method may include determining an orientation of the reflective surface based on laser beams emitted by the electronic device and received following reflection at the reflective surface without being emitted into the area of interest.

According to various embodiments there is provided a computer-readable medium with computer program code for causing an apparatus to perform at least the following actions. The actions include projecting direct laser beams toward an area of interest, and projecting reflected laser beams toward the area of interest, wherein the reflected laser beams are reflected from a reflective surface disposed at a known location relative to the apparatus. The actions also include receiving light scattered from the area of interest resulting from the direct laser beams and the reflected laser beams, and determining signal characteristics of the detected scattered light received from the area of interest caused by both the direct laser beams and the reflected laser beams. The actions also include computing a depth map corresponding to the area of interest based on the signal characteristics.

BRIEF DESCRIPTION OF THE DRAWINGS

Example embodiments will now be described, by way of non-limiting example, with reference to the accompanying drawings, in which.

DETAILED DESCRIPTION

Lidar is a technique for measuring distances by illuminating an object with laser light and measuring characteristics of the return light signals such as time of flight. The projected outgoing light signal is compared with the detected return light signal to determine the distance to the object. This distance information can be used to create a 3D map of an object or several objects in an area of interest such as a room. Some embodiments of lidar use an array of projected lasers to image an area of interest. Using a laser array instead of a single light source provides improvements in system compactness and complexity, to the point where lidar systems may now be embodied in consumer electronics devices such as smart phones, but may limit spatial resolution due to a fixed and hardware-limited number of projected points.

The present disclosure describes techniques for enhancing the resolution of lidar mapping by projecting direct and reflected laser beam toward the area of interest. An example lidar apparatus may be a hand held electronic device such as a smart phone for example. The reflective surface may be disposed at a known location adjacent to the lidar apparatus and may be a component of the apparatus or may be configured to be disposed in proximity to the apparatus.

In accordance with embodiments, an apparatus may be a smart phone arranged to have a reflective surface to generate the reflected laser beams. For example, the smart phone may have a clamshell form factor with two portions connected by a hinge and the reflective surface may one of the portions of the smart phone.

In some embodiments, the user is guided to position the phone and the reflective surface such that some of the emitted lidar points reflect off the reflective surface and project onto an object or objects within the area of interest, while others arrive directly at the objects without such reflection. The direct laser projections may be held stationary on the object, while the angle of the reflective surface is changed to scan the reflected points across the object, increasing spatial resolution by making measurements at one or more intermediate points between the direct lidar points.

The direct points can be used to continuously update the true range between the smartphone and the object to correct for relative motion. In some embodiments, the lidar apparatus measures the angle of the reflective surface (via onboard sensors or lidar return), and uses this to correct for the additional path length travelled by the reflected points to build up a high resolution depth map. As described below, various additional techniques may be realized by incorporating a reflective surface with known characteristics in proximity to the lidar device.

Figure 1A:
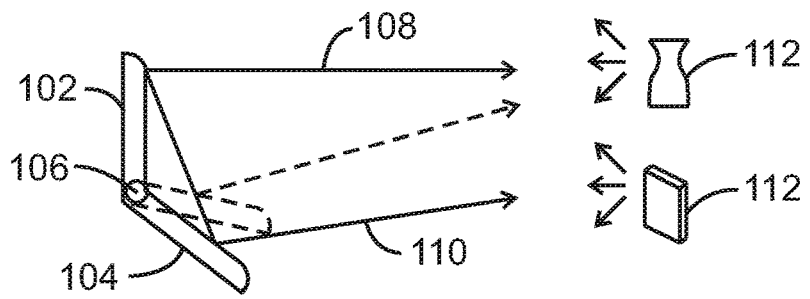
FIGS. 1A, 1B, and 1C are examples of a lidar devices in accordance with embodiments.

FIG. 1A is an example of a lidar apparatus 100 in accordance with embodiments. In this example, the lidar apparatus 100 has a clamshell form factor and includes a first portion 102 and a second portion 104 connected together by a hinge 106. The lidar apparatus 100 may be configured such that the first portion 102 and the second portion 104 are permanently coupled by the hinge. The apparatus 100 may include a display screen disposed on the first portion 102 or spanning across the first portion 102 and second portion 104. For example, the display screen may be a flexible display screen that is able to flex at the hinge 106.

The lidar apparatus 100 includes a laser projector disposed in the first portion 102 that is able to project a plurality of direct laser beams 108 and reflected laser beams 110. The second portion 104 serves as a reflective surface for emitting the reflected laser beams 110 into the area of interest. The direct laser beams 108 are those beams that project into the area of interest directly from the laser projector, while the reflected laser beams 110 are those beams that are first reflected from the reflective surface before being emitted into the area of interest. In other words, the direct laser beams follow a path from the laser projector directly to the area of interest and the reflected laser beams follow a path from the laser projector to a reflective surface disposed at a known location relative to the apparatus then toward the area of interest. The path followed by the direct laser beams may be referred to as the "direct laser beam path" and the path followed by the reflected laser beams may be referred to as the "reflected laser beam path." Although a single direct laser beam 108 and single reflected laser beam 110 are shown, it will be appreciated that the laser projector may be configured to emit several hundreds or thousands of laser beams, which may be arranged to form a grid. For example, the laser projector may be configured to emit a 100-by-100 grid of laser beams.

Laser beams emitted into the area of interest may strike objects 112 within the area of interest, resulting in a scattering effect in which some of the laser light returns to the lidar apparatus and is detected by a photodetector or photodetector array. Through analysis of the signals detected by the photodetector array, the apparatus 100 is able to determine the angle of incidence of the return rays and also determine a distance to the scattering point. For example, the angle of incidence may be determined based on the phase differences between the light signals received at different photodetectors in the photodetector array. The distance to the object in the Z-direction (i.e., depth) may be determined using a variety of lidar-based techniques including pulse-based lidar techniques and phase-based lidar techniques, for example. In pulse-based techniques, the distance is determined based on the time difference between emission of the projected laser beam and the detection of the return signal (time-of-flight). Phase-based lidar measures distance using interferometry, wherein the phase difference between the projected laser beam and the return laser beam are compared to determine the distance. Other techniques for determining the distance to the object can also be used.

For purposes of the present description, the term "direct point" is a point on an object in the area of interest impacted by a direct laser beam, and a "reflected point" is a point on an object in the area of interest impacted by a reflected laser beam (i.e., a laser beam reflected by the reflective surface associated with the lidar apparatus.) Additionally, the term "area of interest" includes any area within the field of view of the lidar apparatus 100. The area of interest may be an area such as a room or an outdoor environment and may include several objects. In some cases, the area of interest may correspond with a specific object that the user is trying to image, such as the user's face.

In some embodiments, the reflective surface provided by the second portion 104 will remain stationary during the lidar imaging process. In such embodiments, the reflected points can be used to double the imaging resolution compared to imaging the area of interest using only the direct points. In the embodiment shown in FIG. 1A, the first portion is held stationary while the angle of the second portion is continuously adjusted during the imaging process to increase the number of reflected points captured, thereby further increasing imaging resolution.

The hinge angle may be measured using sensors configured to detect the orientation of the hinge. The hinge angle, in combination with the known geometry of the lidar apparatus 100, can be used to determine the path of the reflected laser beams. In this way, basic trigonometry can be used to determine the additional distance traveled by the reflected laser beams compared to the direct laser beams due to the reflection. Thus, the hinge angle can be used to calculate the true range to the reflected points that eliminates the additional travel distance caused by the reflection.

During the imaging process, the apparatus may display a user interface that guides the user during the imaging process. For example, the user interface can guide the user regarding how to determine a starting position for the hinge and guide the user to gradually adjust the hinge over a specific range of hinge angles until the imaging process is complete.

Figure 1B:
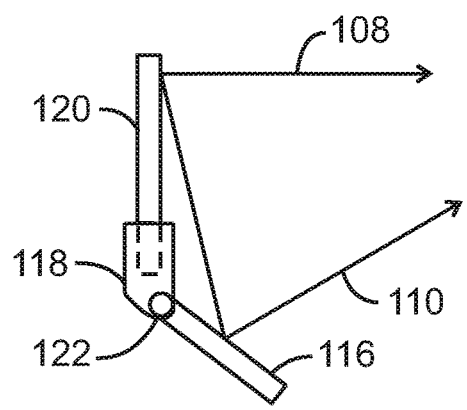

FIG. 1B is another example of a lidar apparatus 114 in accordance with embodiments. The lidar apparatus of FIG. 1B operates similarly to the lidar apparatus of FIG. 1A except that the reflective surface 116 is provided by a peripheral attachment 118 that is configured to be removably coupled to the first portion 120 of the apparatus. For example, the first portion 120 of the lidar apparatus 114 may be a smart phone that can be inserted into a recess in the peripheral attachment 118 which securely couples the peripheral attachment 118 to the smart phone. The peripheral attachment 118 may also include a data connection that couples to the smart phone to enable data to be communicated to the smart phone, such as hinge angle data.

The peripheral attachment 118 can include a hinge 122 that enables the angle of the reflective surface 116 to be adjusted. The peripheral attachment 118 may include one or more sensors and processors for detecting the hinge angle and communicating the hinge angle to the smart phone through the data connection. However, in some examples, the peripheral attachment 118 may not include any electronics or circuitry and provides only the reflective surface 116. In such embodiments, the hinge angle may be detected by detecting laser beams emitted by the laser projector and received by the photodetector following reflection at the reflective surface 116 without being emitted into the area of interest. In some embodiments, the hinge 122 may be eliminated such that the reflective surface is held at a single constant angle relative to the first portion 120.

Figure 1C:
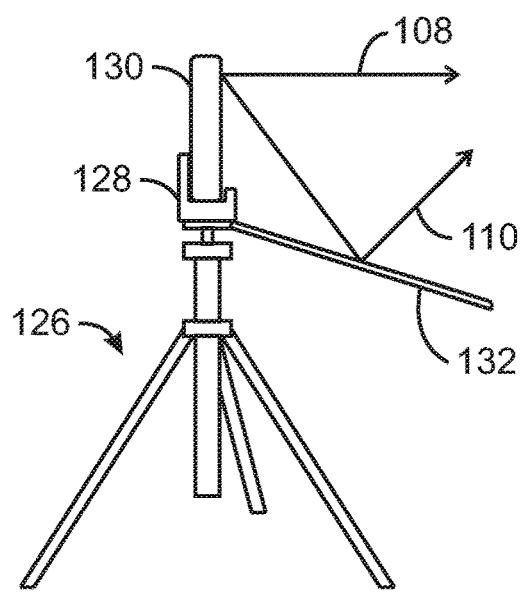

FIG. 1C is another example of a lidar apparatus in accordance with embodiments. The lidar apparatus 124 of FIG. 1C operates similarly to the lidar apparatus of FIG. 1A except that the reflective surface is provided by a stand 126. The stand 126 is a peripheral component that includes a holding surface 128 configured to receive a smart phone 130 and allows the smart phone 130 to be supported without being held by the user. The stand 126 also includes the reflective surface 132. The angle of the reflective surface 132 may be fixed or adjustable.

The above examples shown in FIGS. 1A, 1B, and 1C are not an exhaustive list of the all of the possible ways to implement a reflective surface in lidar imaging, and it will be appreciated that additional configurations are possible within the scope of the present claims. For example, a lidar apparatus in accordance with embodiments may include a smart phone that is configured to perform lidar imaging while the user holds the smart phone adjacent to another surface such as table top or a mirror. Other examples are also possible. Techniques that may be employed using the lidar apparatus of FIGS. 1A, 1B, and 1C are described further below.

Figure 2:
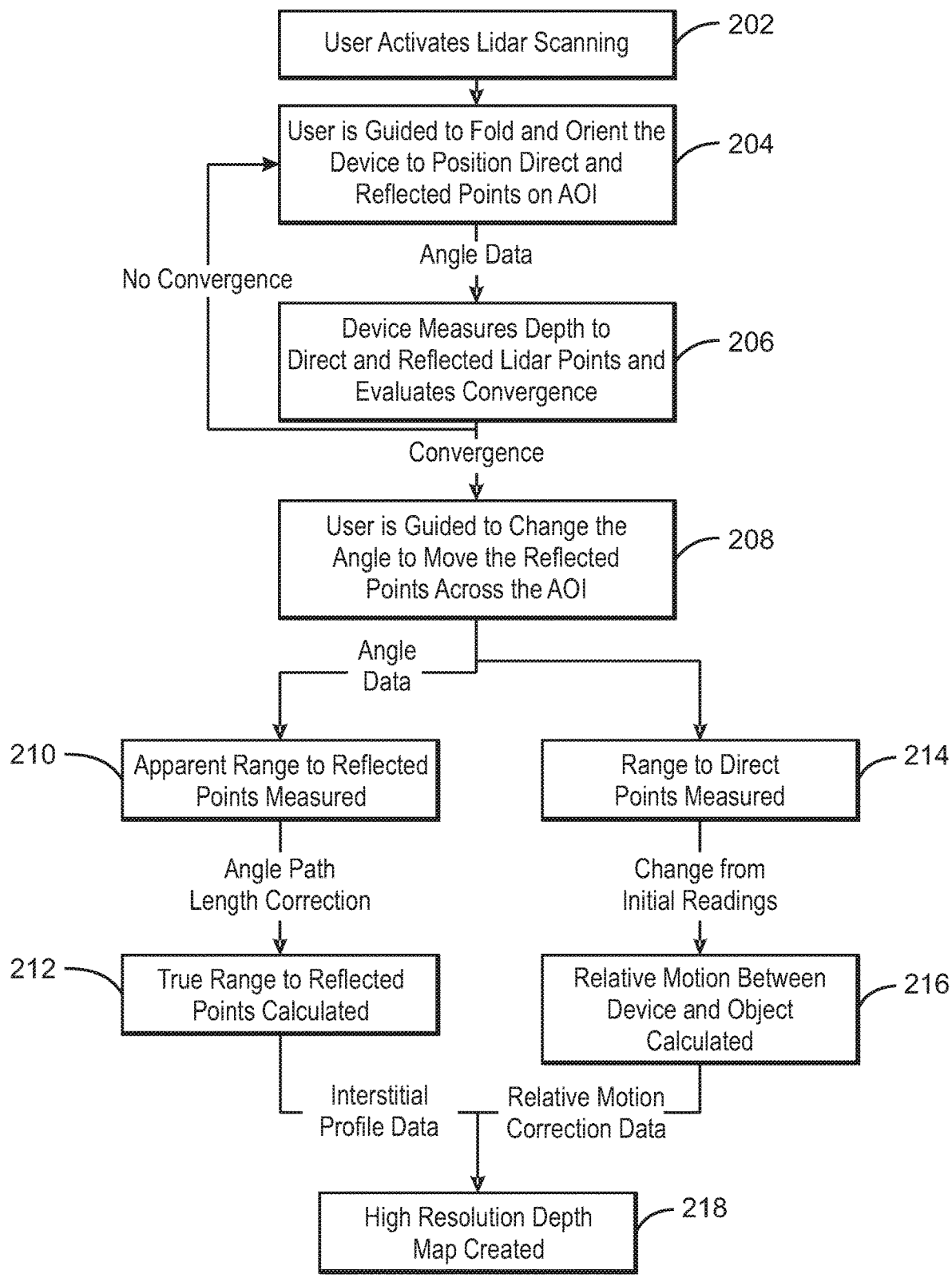
FIG. 2 is process flow diagram illustrating an example method for performing lidar imaging using a lidar device such as one of the lidar devices of FIG. 1A, 1B, or 1C.

FIG. 2 is process flow diagram illustrating an example method for performing lidar imaging using a lidar device such as one of the lidar devices of FIG. 1A, 1B, or 1C. The lidar device used in FIG. 2 can include two portions connected by a hinge, such as the apparatus shown in FIG. 1A or FIG. 1B. Additionally, the method described in FIG. 2 may also be used in lidar devices in which the device is separate from the reflective surface, such as the apparatus shown in FIG. 1C. The lidar device can also include a display screen with a user interface that guides the user through the imaging process. It will be appreciated the processes shown in FIG. 2 may be performed in an order different from what is shown, and that the method 200 may also include fewer or additional processes depending on the design considerations of a particular embodiment. The method may begin at block 202.

At block 202, the user activates lidar scanning. The lidar scanning feature may be presented to the user in a graphical user interface or may be activated by the press of a button, for example. In some embodiments, the user may select a particular object to be scanned. For example, the device's display may be configured to display a video image captured by the device's visual camera, and the user may select a particular object or region within view of the camera. The entire field of view of the device's lidar system may be scanned or the field of view of the lidar system may be adjusted to focus on the selected area or object.

At block 204, the user is guided to orient the device to position direct and reflected points within the area of interest (AOI). For example, the user may be instructed to point the device at the object or objects to be scanned and orient the reflective surface to provide a suitable starting angle.

At block 206, the angle of the reflective surface is determined and the device measures the distance to the direct and reflected lidar points and determines whether the points converge. The distance to the reflected lidar points will be corrected according to the current hinge angle to arrive at a depth measurement that represents the true range to the reflected points. Convergence is detected if the direct and reflected lidar points provide the same distance measurements within a specified threshold. In other words, the depth map measured using at least one of the direct points matches the depth map measured using at least one of the reflected points to within an acceptable degree of mismatch. This indicates that the direct and reflected laser beams are impacting the same points on objects in the area of interest. Convergence of the direct and reflected points ensures that the direct points will provide a stable point of reference for the reflected points during the collection of the depth measurement data. If convergence is not detected, the process flow returns to block 204 and the user is further guided to adjust the hinge angle. If convergence is detected, the user may be instructed to stop adjusting the angle, or alternatively may continue to adjust. The hinge angle detected at the angle of convergence serves as the initial measurement point and the process flow advances to block 208.

At block 208, the user is guided to change the angle to move the reflected points across the area of interest while the direct points are held stationary or as close as possible to stationary considering small unintentional movements of the user. As the user adjusts the angle, the angle is detected and depth measurements are collected as described in relation to blocks 210 to 216. It will be appreciated that the processes described in relation to blocks 210 and 212 can be performed in parallel with the processes described in relation to blocks 214 and 216. During the depth measurements, the user may continue to receive instructions through the user interface regarding progress of the scan. For example, the user could be instructed to increase or decrease the rate of the angle adjustment depending on the desired spatial resolution, and/or to repeatedly scan through the same range of hinge angles to allow repeat measurements to be made of the same area of interest.

In some examples, the user interface guides the user to scan specific objects with known characteristics more accurately or easily in high resolution by use of a pre-existing object model. Object features that may benefit from higher resolution scanning may be those with sharper shape changes. For example, if the imaging process is being performed to image a person's face, the user interface may guide the user to image specific features of the face with higher resolution, such as the area around the nose. Accordingly, a pre-existing object model of an average human face may be used to determine which areas are to be imaged with higher resolution. In those areas to be imaged with higher resolution, the user interface may guide the user to adjust the angle of the reflective surface more slowly compared to areas to be imaged with lower resolution.

At block 210, the apparent range to the reflected points is measured. The apparent range includes the distance from the laser projector to the reflective surface and from the reflective surface to the reflected point. Several range measurements may be made during the scanning process as the user is adjusting the hinge angle. The apparent range measurements can be performed at regular time intervals during the scanning process or at specific increments of the hinge angle.

At block 212, the true range to the reflected points is calculated. The true range to the reflected points is the distance from the laser projector to the reflected point. The true range can be calculated by using the hinge angle and known dimensions of the lidar device to determine the path of the reflected laser beam. In some examples, the true range can be determined using a path length correction transformation that uses the apparent range and the angle of the reflective surface as inputs and provides the true range as an output. The result of the processing at block 212 is a set of interstitial profile data that describes the depth measured at various reflected points that lie between the direct points.

At block 214, the range to the direct points is measured. As with the reflected points, the direct points may be measured continuously throughout the scanning process.

At block 216, the relative motion between the device and an object in the area of interest is determined. The relative motion indicates the change in the position of the device during the scan. For example, small motions of the user may cause the user to inadvertently move the device during the scanning process. The relative motion in the direct range measurements can be used to generate motion correction data that can be used to correct for motions of the device during scanning.

At block 218 the high resolution depth map is generated by combining the depth data gathered for the direct points and the indirect points. The direct points used in the depth map may be the initial depth points measured at the start of the scanning process, e.g., when convergence is detected at block 206. The reflected points provide the interstitial profile data calculated at block 212. For each of the interstitial points, there will be a motion correction factor that was measured at block 216. The motion correction can be subtracted from the interstitial profile data to provide motion corrected interstitial profile data.

Additional motion corrections may also be made to the data to correct for motions in the X-Y plane. Motions of the user may cause movement of the direct and reflected points in the X-Y plane. These movements may be detected, for example, by inertial motion sensors in the lidar device, such as accelerometers. Motions detected by the inertial motion sensors may be subtracted from the interstitial profile data as an additional correction factor.

Figure 3:
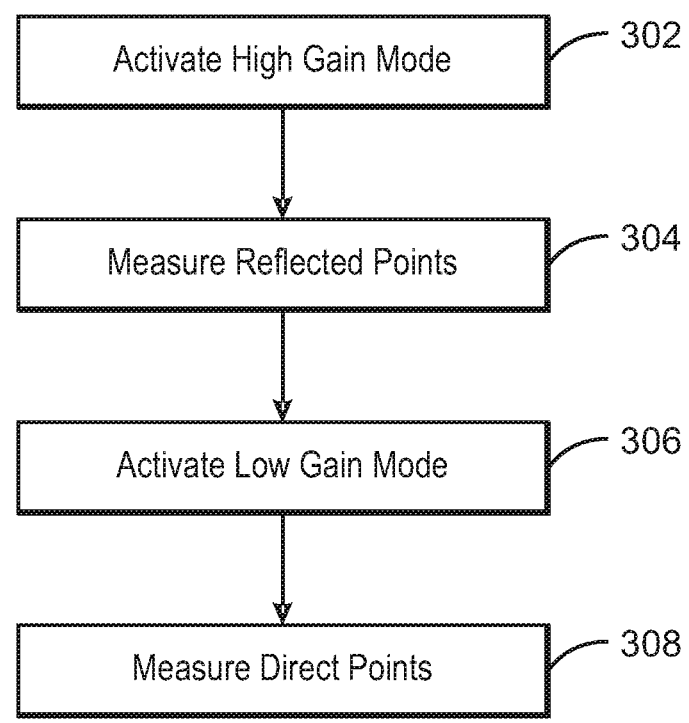
FIG. 3 is a process flow diagram illustrating an example method for distinguishing between direct points and reflected points.

FIG. 3 is a process flow diagram illustrating an example method for distinguishing between direct points and reflected points. The method 300 enables the lidar device to distinguish between direct points and reflected points during the imaging process, and may be used in the imaging process described in FIG. 2. It will be appreciated the processes shown in FIG. 3 may be performed in an order different from what is shown, and that the method 300 may also include fewer or additional processes depending on the design considerations of a particular embodiment. The method may begin at block 302.

At block 302, a high gain mode of the lidar device's photosensor is activated. This increases the sensitivity of the photosensor, which will cause the direct and reflected points to appear brighter. During high gain mode, the direct points may cause saturation of the photosensor.

At block 304, the reflected points are measured. Any points that result in saturation can be disregarded as direct points. Points that do not result in saturation may be identified as reflected points.

At block 306, a low gain mode of the lidar device's photosensor is activated. This reduces the sensitivity of the photosensor, which will cause the direct and reflected points to appear dimmer.

At block 308, the direct points are measured. During low gain mode, the direct points may no longer be saturated, and the reflected points may not be detected at all. In some embodiments, a brightness threshold may be specified, and any points below the brightness threshold may be disregarded, while points above the brightness threshold can be identified as direct points.

The method described herein may be repeated throughout the scanning process to collect distance measurements for the direct and reflected points. Additionally, the process of switching between the high gain mode and the low gain mode may be performed at a high frequency so that any user motions, hinge angle changes, or object motions will have a negligible effect on the measurement data in between the measurement of the reflected points and the measurement of the direct points. Additionally, it will be appreciated that the method 300 is not the only possible technique for measuring the direct and reflected points. For example, in some embodiments, the direct and reflected points can be distinguished in a similar manner as described above by adjusting the intensity of the projected laser beams rather than the gain of the photodetector. In some embodiments, the direct and reflected points may be measured simultaneously.

Figure 4:
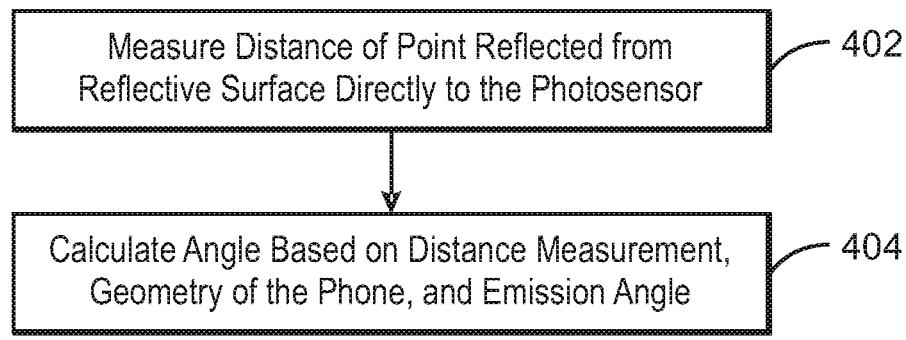
FIG. 4 is a process flow diagram illustrating an example method for measuring the angle of a reflective surface using a lidar device.

FIG. 4 is a process flow diagram illustrating an example method for measuring the angle of a reflective surface. The method may be implemented in any of the lidar devices described in relation to FIGS. 1A, 1B, and 1C, and may be beneficial in embodiments in which the lidar device is not equipped to determine the angle of the reflective surface with dedicated hinge angle sensors. The method may begin at block 402.

At block 402, the distance is measured for a point that is reflected from the reflective surface directly to the photosensor. In other words, this point corresponds with a laser beam emitted by the laser projector and received by the photodetector following reflection at the reflective surface without being emitted into the area of interest. In some embodiments, this point may be differentiated from points that lie within the area of interest based on the time of flight data or the signal strength. For example, any point that has a time of flight lower than a specified threshold or a signal strength above a specified threshold (or both) may be identified as being received directly from the reflective surface, i.e., without having been emitted into the area of interest.

At block 404, the angle of the reflective surface is calculated based on the distance measurement, the known geometry of the phone, and the emission angle of the projected laser beam corresponding to the detected point. In some embodiments, the angle measurements determined by the method 400 may be used to calculate the true range to the reflected points as referenced in FIG. 2. In other embodiments, the angle data used to calculate the true range to the reflected points may be provided by sensors that measure the hinge angle directly. In such embodiments, the method 400 may be used to calibrate the hinge angle sensors.

Figure 5:
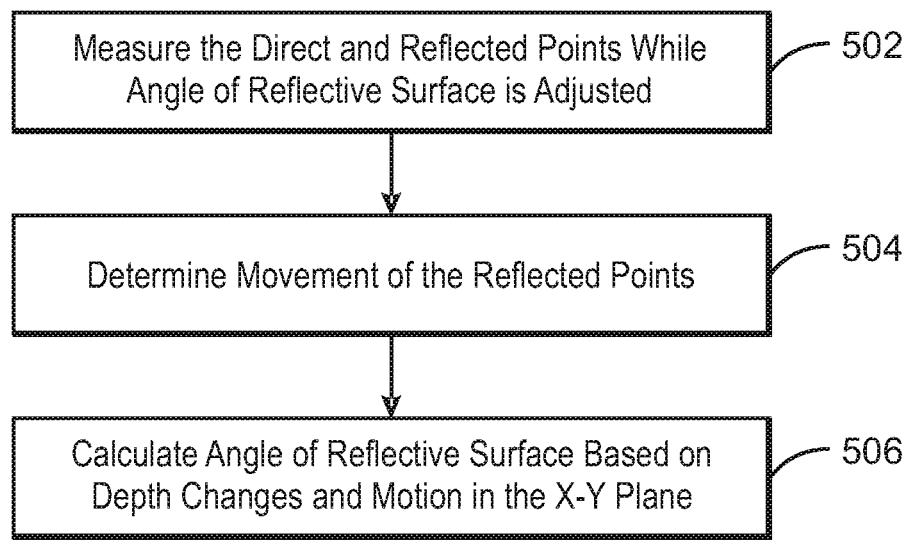
FIG. 5 is a process flow diagram illustrating another example method for measuring the angle of a reflective surface using a lidar device.

FIG. 5 is a process flow diagram illustrating another example method for measuring the angle of a reflective surface using a lidar device. The method 500 may be used in any of the lidar devices described in relation to FIGS. 1A, 1B, and 1C, and may be beneficial in embodiments in which the lidar device is not equipped to determine the angle of the reflective surface with dedicated hinge angle sensors. The method may begin at block 502.

At block 502, measurements are made for the direct and reflected points while the angle of the reflective surface is adjusted. The measurements may include the depth of the direct and reflected points as well as the position of the direct and reflected points in the X-Y plane. The X-Y plane is the plane of the two-dimensional image captured by the device's camera, which is also the plane of the photosensor array. In some embodiments, the device's user interface may guide the user to perform the measurements against a flat surface such as a wall. Additionally, the user interface may guide the user to align the direct and reflected points so that they converge on the same locations for the initial measurement.

At block 504, the movement of the reflected points is determined. The movement of the direct and reflected points includes the change in the distance to the points as well as the movement in the X-Y plane while the angle of the reflective surface is adjusted.

At block 506, the angle is calculated based on the depth changes and the motion of the reflected points in the X-Y plane. The angle can be calculated using basic trigonometry from the change in distance and the movement of the reflected points in the X-Y plane. In some embodiments, the angle measurements determined by the method 500 may be used to calculate the true range to the reflected points as referenced in FIG. 2. In other embodiments, the angle data used to calculate the true range to the reflected points may be provided by sensors that measure the hinge angle directly. In such embodiments, the method 500 may be used to calibrate the hinge angle sensors.

Figure 6:
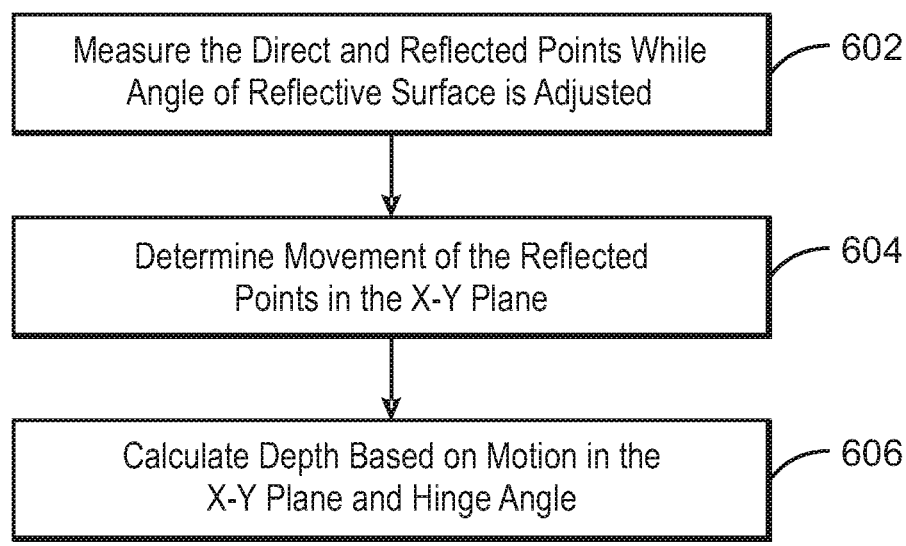
FIG. 6 is a process flow diagram illustrating an example method for measuring range without the use of lidar-based depth detection.

FIG. 6 is a process flow diagram illustrating an example method for measuring range without the use of lidar-based depth detection. The method 600 may be used in any of the lidar devices described above, and may be beneficial in calibrating the device's lidar-based depth detection system. The method may begin at block 602.

At block 602, measurements are made for the direct and reflected points while the angle of the reflective surface is adjusted. The measurements may include the position of the direct and reflected points in the X-Y plane and the angle of the reflective surface. The position measurements may be performed using the device's photodetector array or on-board camera. The angle measurements may be performed using hinge angle sensors. In some embodiments, the device's user interface may guide the user to perform the measurements. For example, the user interface may guide the user to align the direct and reflected points so that they converge on the same locations for the initial measurement.

At block 604, the movement of the reflected points is determined. The movement of the direct and reflected points includes the movement in the X-Y plane while the angle of the reflective surface is adjusted.

At block 606, the depth of objects on the area of interest is calculated based on the motion of the reflected points in the X-Y plane as a function the hinge angle change. The depth can be calculated using basic trigonometry from the change in angle and the movement of the reflected points in the X-Y plane compared to the stationary direct points.

Figure 7:
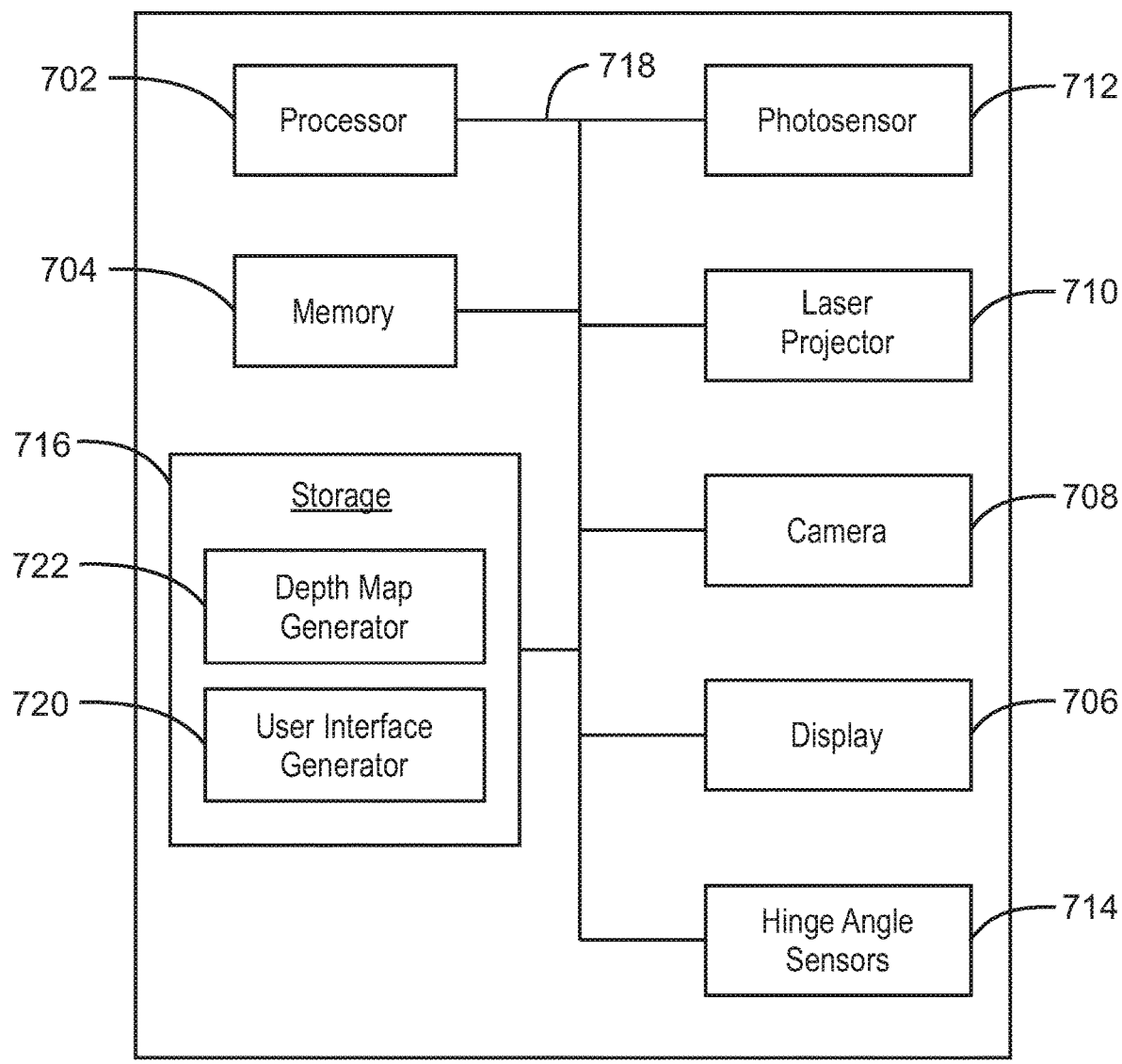
FIG. 7 is a block diagram of an example lidar device in accordance with embodiments.

FIG. 7 is a block diagram of an example lidar device in accordance with embodiments. The lidar device 700 may be used to implement any of the techniques described herein. The lidar device 700 may be, for example, a smart phone, a laptop computer, or tablet computer, among others. In some embodiments, the lidar device 700 may be a smart phone with a clamshell form factor. The lidar device 700 may include a processor 702 configured to execute stored instructions, as well as a memory device 704 that stores instructions that are executable by the processor 702. The processor may be any suitable type of processor including a single core or multiple core central processing unit (CPU), a microcontroller, Application Specific Integrated Circuit (ASIC), a Field Programmable Gate Array (FPGA), and others.

The memory device 704 can include random access memory (e.g., SRAM, DRAM), read only memory (e.g., EPROM, EEPROM, etc.), flash memory, or any other suitable memory systems. The memory device 704 can be used to store data and software code that configure the processor to perform the various functions described herein.

The lidar device 700 can also include a display 706 and a camera 708 configured to capture still images or video. Images or video captured by the camera 708 can be sent to various other components of the lidar device 700, such as the display 706.

The lidar device 700 also includes a laser projector 710 configured to project the direct and reflected laser beams for lidar-based ranging and imaging. In examples, the laser projector 710 may be a vertical cavity surface emitting laser (VCSEL) array configured to project a plurality of lasers into the area of interest.

The lidar device 700 also includes a photosensor 712 configured to detect return light signals originating from the laser projector. The return light signals may be due to scattering from direct or reflected laser beams impacting objects in the area of interest. Signal characteristics of the detected scattered light caused by both the direct laser beam paths and the reflected laser beam paths may be used to compute a depth map corresponding to the area of interest. The photosensor 712 may be a single photosensor or a photosensor array. In examples, the photosensor 712 may be single photon avalanche diode (SPAD) array.

The lidar device 700 can also include one or more hinge angle sensors 714 configured to detect the angle of the reflective surface. The hinge angle may be reported to other components of the device 700 through a dedicated application programming interface (API) that interfaces with the hinge angle sensors 714.

The lidar device 700 may also include a storage device 716. The storage device 716 may be any non-transitory computer-readable medium configured for long-term non-volatile storage of data and computer program code. The storage device 716 may be any type of physical memory device, such as a hard drive, a flash drive, and the like.

Communications between various components of the lidar device 700 can be performed over one or more data busses 718 using any suitable communication protocols, such as Mobile Industry Processor Interface (MIPI) D-PHY, PCIe, SPI, USB, among others. The bus architecture shown in FIG. 7 is just one example of a bus architecture that can be used with the techniques disclosed herein. In some examples, the data bus 718 may be a single bus that couples the components of the lidar device 700 according to a particular communication protocol. Furthermore, the lidar device 700 can also include any suitable number of data busses of varying types, which may use different communication protocols to couple specific components of the computing device according to the design considerations of a particular implementation. Various additional components may be included depending on the design considerations for a particular implementation.

The storage device 716 may include any number of software applications for performing the techniques described herein, such as a user interface generator 720 and a depth map generator 722. The user interface generator 720 may be configured to generate a graphical user interface to be rendered on the display 706 and that guides the user to perform lidar imaging as described herein. For example, the user interface can provide options that enable the user to initiate the imaging process. During the imaging process, the user interface can guide the user in how to manipulate the device to acquire suitable data points, such as how to position the device or how to orient the reflective surface.

The depth map generator 722 collects the measurement data and generates the depth map in accordance with the techniques described herein. The depth to each of the direct points and reflected points may be determined by measuring signal characteristics of the direct laser beams and reflected laser beams that are scattered from the region of interest. The depth map generator may then compute a depth map corresponding to the region of interest based on the measured signal characteristics. For example, the signal characteristic may be a time-of-flight measurement in the case of pulse-based lidar or a phase difference between the projected light and the return light in the case of phase-based lidar. The depth map may be generated using depth measurements calculated for the direct points and the reflected points. The depth map generator can also combine the depth map with a visual image captured by the camera.

In some embodiments, the depth to the reflected points may be measured at any number of interstitial points between the direct points as the angle of the reflected surface is adjusted. In other embodiments, the angle of the reflective surface may be kept constant during the imaging process after the angle has been adjusted to a suitable angle. For example, data may be collected for a single set of direct points and a single set of reflected points, resulting in a depth map with double the resolution compared to using the direct points alone. In some embodiments, the lidar device 700 may be equipped to perform active scanning, wherein the laser projections are scanned across the area of interest using phased array techniques or mechanical scanning. In such embodiments, the user interface may guide the user to orient the device and adjust the angle of the reflective surface to a suitable position then hold the device still while the imaging process is performed.

In addition to generating a depth map or determining the distance to an object, other information may also be extracted from measurable differences between the direct and the reflected lidar points. For example, reflected points will contain distortions due to the reflective surface (sometimes referred to as "speckle" patterns), while the direct points will not. In some embodiments, speckle contrast imaging may be performed by analyzing the differing speckle patterns to enable imaging of features of the reflective surface or the intervening atmosphere. Additionally, an object to be analyzed through speckle contrast imaging may be placed on the reflective surface so as to interact with the reflected points to image or measure the foreign object.

It is to be understood that the block diagram of FIG. 7 is not intended to indicate that the lidar device 700 is to include all of the components shown in FIG. 7. Rather, the lidar device 700 can include fewer or additional components not illustrated in FIG. 7. Furthermore, the components may be coupled to one another according to any suitable system architecture, including the system architecture shown in FIG. 7 or any other suitable system architecture. Additionally, some components of the lidar device 700 may be externally coupled such as the hinge angle sensors in embodiments in which the reflective surface is a component of a peripheral attachment as shown in FIG. 1B.

The techniques described herein can also be implemented in other types and combinations of circuitry. As used in this application, the term "circuitry" may refer to hardware-only circuit implementations or implementations that use a combination of hardware circuits and computer code, such as software or firmware. Hardware-only implementations may include implementations in analog or digital circuitry or a combination thereof. Implementations in a combination of hardware and computer code include processors programmed with computer code stored to one or more memory devices, which may be incorporated into the processor or accessible by the processor through a memory access interface.

It is to be understood that what is described above is what is presently considered the preferred embodiments. However, it should be noted that the description of the preferred embodiments is given by way of example only and that various modifications may be made without departing from the scope as defined by the appended claims.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims. For example, features described in the preceding description may be used in combinations other than the combinations explicitly described above. Additionally, although functions have been described with reference to certain features, those functions may be performable by other features whether described or not. Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of cat least one' or 'one or more' may be used to emphasize an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

While endeavoring in the foregoing specification to draw attention to those features believed to be of importance, it should be understood that the Applicant may seek protection via the claims in respect of any patentable feature or combination of features hereinbefore referred to and/or shown in the drawings whether or not emphasis has been placed thereon.

What is claimed is:

1. An apparatus comprising:
   a laser projector configured to direct a plurality of laser beams toward an area of interest, wherein a first one of the plurality of laser beams follows a first laser beam path comprising a direct laser beam path from the laser projector to the area of interest, and a second one of the plurality of laser beams follows a second laser beam path comprising a reflected laser beam path from the laser projector to a reflective surface disposed at a location relative to the apparatus then toward the area of interest;
   a photodetector configured to detect:
      a first scattered light scattered in the area of interest in response to the direct laser beam path being incident on the area of interest; and
      a second scattered light scattered in the area of interest in response to the reflected laser beam path being incident on the area of interest;
   at least one processor; and
   at least one memory including computer program code, the at least one memory and the computer program code configured to, with the at least one processor, cause the apparatus at least to:
      determine first signal characteristics of the detected first scattered light caused by the direct laser beam path being incident on the area of interest;
      determine second signal characteristics of the detected second scattered light caused by the reflected laser beam path being incident on the area of interest; and
      compute a depth map corresponding to the area of interest based on the first and second signal characteristics;
   wherein the first one of the plurality of laser beams is configured to originate from a first portion;
   the second one of the plurality of laser beams is configured to originate from the first portion;
   the reflective surface is disposed on a second portion;
   an angle of the reflective surface relative to the first portion is configured to be adjusted by a user to each of a plurality of angles during a scan of interest; and
   the computing of the depth map corresponding to the area of interest is also based on the plurality of angles.

2. The apparatus of claim 1, wherein the second portion is a peripheral component configured to be disposed in proximity to apparatus at the location, and the reflective surface is disposed on the peripheral component.

3. The apparatus of claim 1, wherein the second portion is a component of a peripheral attachment configured to be removably coupled to the apparatus, and the reflective surface is the component of the peripheral attachment.

4. The apparatus of claim 1, wherein the second portion is a component of the apparatus, and the reflective surface is disposed on the component of the apparatus.

5. The apparatus of claim 1, wherein the apparatus comprises the first portion and the second portion, and the first and second portions are coupled by a hinge.

6. The apparatus of claim 5, wherein the apparatus is a smart device with a clamshell form factor and wherein the first portion and the second portion are coupled by the hinge.

7. The apparatus of claim 5, wherein the second portion is a component of a peripheral attachment configured to be removably coupled to the apparatus.

8. The apparatus of claim 1, wherein the at least one memory and the computer program code are configured to, with the at least one processor, further cause the apparatus at least to determine each of the plurality of angles; and each of the plurality of angles is determined based on laser beams emitted by the laser projector and received by the photodetector after reflection at the reflective surface without being emitted into the area of interest.

9. The apparatus of claim 1, wherein the at least one memory and the computer program code are configured to, with the at least one processor, further cause the apparatus at least to guide a user to adjust the angle to each of the plurality of angles during the scan of the area of interest.

10. The apparatus of claim 1, wherein the at least one memory and the computer program code are configured to, with the at least one processor, further cause the apparatus at least to distinguish the direct laser beam path and the reflected laser beam path by switching between a high gain mode to detect reflected laser beams and a low gain mode to detect direct laser beams.

11. The apparatus as claimed in claim 1, wherein the at least one memory and the computer program code are configured to, with the at least one processor, further cause the apparatus at least to:
generate a user interface configured to guide a user to adjust the angle until at least one of the laser beams that follow a direct laser beam path, and at least one of the laser beams that follow a reflected laser beam path, lie on a same point within the area of interest.

12. The apparatus as claimed in claim 1, wherein the at least one memory and the computer program code are configured to, with the at least one processor, further cause the apparatus at least to:
determine an orientation of the reflective surface based on one or more laser beams emitted by the laser projector and received by the photodetector, following reflection at the reflective surface, without being emitted into the area of interest.

13. The apparatus of claim 1, further comprising a sensor configured to measure the angle.

14. A method, comprising:
projecting direct laser beams from a first portion toward an area of interest;
projecting reflected laser beams from the first portion toward the area of interest, wherein the reflected laser beams are reflected from a reflective surface disposed at an angle relative to the first portion;
receiving first scattered light scattered in the area of interest in response to the direct laser beams being incident on the area of interest;
receiving second scattered light scattered in the area of interest in response to the reflected laser beams being incident on the area of interest;
determining first signal characteristics of the received first scattered light received from the area of interest caused by the direct laser beams being incident on the area of interest;
determining second signal characteristics of the received second scattered light received from the area of interest caused by the reflected laser beams being incident on the area of interest; and
computing a depth map corresponding to the area of interest based on the first and second signal characteristics;
wherein an angle of the reflective surface relative to the first portion is adjusted by a user to each of a plurality of angles during a scan of the area of interest; and
the computing of the depth corresponding to the area of interest is also based on the plurality of angles.

15. The method of claim 14, comprising generating a user interface that guides the user to adjust the angle until at least one of the direct laser beams and at least one of the reflected laser beams lie on a same point within the area of interest.

16. The method of claim 14, wherein the electronic device comprises the first portion and a second portion, the first and second portions are coupled by a hinge, and the reflective surface is disposed on the second portion.

17. The method of claim 14, comprising determining an orientation of the reflective surface based on laser beams emitted by the electronic device and received following reflection at the reflective surface without being emitted into the area of interest.

18. The method of claim 14, wherein the reflective surface is disposed on one of:
a peripheral component disposed in proximity to the electronic device, and
a component of a peripheral attachment removably coupled to the electronic device.

19. A non-transitory computer readable medium comprising computer program code for causing an apparatus to perform at least the following:
projecting direct laser beams toward an area of interest;
projecting reflected laser beams toward the area of interest, wherein the reflected laser beams are reflected from a reflective surface disposed at a known angular location relative to the apparatus, wherein the angular location is configured to adjusted by a user to each of a plurality of angular locations during a scan of the area of interest;
receiving first light scattered from the area of interest in response to the direct laser beams being incident on the area of interest;
receiving second light scattered from the area of interest in response to the reflected laser beams being incident on the area of interest;
determining first signal characteristics of the received first scattered light received from the area of interest caused by the direct laser beams being incident on the area of interest;
determining second signal characteristics of the received second scattered light received from the area of interest caused by the reflected laser beams being incident on the area of interest; and
computing a depth map corresponding to the area of interest based on the first and second signal characteristics and on the plurality of angles.

20. The non-transitory computer readable medium of claim 19, wherein the computer program code is further configured to cause the apparatus to:
generate a user interface that guides a user to adjust an angle of the reflective surface until at least one of the direct laser beams and at least one of the reflected laser beams lie on a same point within the area of interest.

21. The non-transitory computer readable medium of claim 19, wherein the apparatus comprises a first portion and a second portion coupled by a hinge, wherein the direct laser beams and reflected laser beams originate from the first portion, and wherein the reflective surface is disposed on the second portion.

22. The non-transitory computer readable medium of claim 19, wherein the computer program code is further configured to cause the apparatus to: determine an orientation of the reflective surface based on laser beams emitted by the apparatus and received following reflection at the reflective surface without being emitted into the area of interest.

23. The computer readable medium of claim 19, wherein the apparatus comprises a first portion;

the direct laser beams and reflected laser beams originate from the first portion; and the reflective surface is disposed on one of:
  a peripheral component configured to be disposed in proximity to the apparatus, and
  a component of a peripheral attachment configured to be removably coupled to the apparatus.

* * * * *